United States Patent
Liu et al.

(10) Patent No.: US 9,308,499 B1
(45) Date of Patent: Apr. 12, 2016

(54) POLYIMIDE BLEND MEMBRANES FOR GAS SEPARATIONS

(71) Applicant: UOP LLC, Des Plaines, IL (US)

(72) Inventors: Chunqing Liu, Arlington Heights, IL (US); Howie Q. Tran, Skokie, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 14/496,789

(22) Filed: Sep. 25, 2014

(51) Int. Cl.
*B01D 71/64* (2006.01)
*B01D 63/00* (2006.01)
*B01D 69/12* (2006.01)

(52) U.S. Cl.
CPC .............. *B01D 63/00* (2013.01); *B01D 69/125* (2013.01); *B01D 71/64* (2013.01)

(58) Field of Classification Search
CPC ...... B01D 53/228; B01D 63/00; B01D 69/10; B01D 69/125; B01D 71/64
USPC ............................................ 95/45, 51; 96/14
See application file for complete search history.

(56) References Cited

U.S. PATENT DOCUMENTS

| 4,113,628 | A | * | 9/1978 | Alegranti | ............... | B01D 71/64 210/500.23 |
| 5,085,676 | A | * | 2/1992 | Ekiner | ................... | B01D 71/64 96/13 |
| 7,247,191 | B2 | | 7/2007 | Koros et al. | | |
| 7,485,173 | B1 | | 2/2009 | Liu et al. | | |
| 8,016,124 | B2 | | 9/2011 | Yates et al. | | |
| 8,337,598 | B2 | | 12/2012 | Yates et al. | | |
| 2004/0107830 | A1 | * | 6/2004 | Simmons | ............. | B01D 53/228 95/45 |
| 2010/0317751 | A1 | * | 12/2010 | Van Brugge | ......... | B01D 53/228 95/55 |
| 2012/0322911 | A1 | * | 12/2012 | Liu | ...................... | B01D 53/228 522/164 |

OTHER PUBLICATIONS

U.S. Appl. No. 14/496,754, filed Sep. 25, 2014.

* cited by examiner

*Primary Examiner* — Jason M Greene

(57) ABSTRACT

The polyimide blend membrane in the present invention was prepared by blending a first aromatic polyimide with high permeability and a second aromatic polyimide with high selectivity for gas separation. The polyimide blend membrane in the present invention showed improved permeability compared to membranes made from the second aromatic polyimide and improved selectivity compared to membranes made from the first aromatic polyimide.

10 Claims, No Drawings

POLYIMIDE BLEND MEMBRANES FOR GAS SEPARATIONS

BACKGROUND OF THE INVENTION

This invention relates to polyimide blend membranes and methods for making and using these membranes. In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes and have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or an extraordinarily large membrane surface area is required to allow separation of large amounts of gases or liquids. Permeance, measured in Gas Permeation Units (GPU, 1 GPU=$10^{-6}$ $cm^3$ (STP)/$cm^2$ s (cm Hg)), is the pressure normalized flux and is equal to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Such membranes are characterized by a thin, dense, selectively semipermeable surface "skin" and a less dense void-containing (or porous), non-selective support region, with pore sizes ranging from large in the support region to very small proximate to the "skin". However, fabrication of defect-free high selectivity asymmetric integrally skinned polyimide membranes is difficult. The presence of nanopores or defects in the skin layer reduces the membrane selectivity. The high shrinkage of the polyimide membrane on cloth substrate during membrane casting and drying process results in unsuccessful fabrication of asymmetric integrally skinned polyimide flat sheet membranes using phase inversion technique.

US 2005/0268783 A1 disclosed chemically cross-linked polyimide hollow fiber membranes prepared from a monoesterified polymer followed by final cross-linking after hollow fiber formation.

U.S. Pat. No. 7,485,173 disclosed UV cross-linked mixed matrix membranes via UV radiation. The cross-linked mixed matrix membranes comprise microporous materials dispersed in the continuous UV cross-linked polymer matrix.

U.S. Pat. No. 8,016,124 disclosed a thin film composite membrane (TFC) comprising a blend of polyethersulfone and aromatic polyimide polymers. The TFC membrane has a layer of a blend of polyethersulfone and aromatic polyimide with a thickness from about 0.1 to about 3 microns.

U.S. Pat. No. 8,337,598 disclosed a TFC hollow fiber membrane with a core player and a sheath UV-crosslinked polymer layer.

The selective thin layer on the non-selective porous layer of a thin film composite (TFC) membrane can be delaminated easily from the non-selective porous layer, which will result in significantly decreased selectivity for gas separations. On the other hand, the integrally-skinned asymmetric membranes have a selective thin layer and a porous layer from the same membrane material and formed from the same membrane solution at about the same time. Therefore, the selective thin layer of an integrally-skinned asymmetric membrane cannot be delaminated easily from the non-selective porous layer.

The present invention discloses polyimide blend membranes and methods for making and using these membranes.

SUMMARY OF THE INVENTION

This invention pertains to polyimide blend membranes and methods for making and using these membranes. This invention pertains to polyimide blend thin film composite or asymmetric membrane with either flat sheet or hollow fiber geometry.

The term "polyimide blend membrane" in the present invention refers to a membrane prepared from a blend of two or more polyimide polymers.

The present invention provides a polyimide blend membrane comprising a miscible blend of an aromatic polyimide I that comprises a plurality of repeating units of formula (I) and an aromatic polyimide II that comprises a plurality of repeating units of formula (II), wherein formula (I) is linked to each other through possible direct covalent bonds by exposure to UV radiation. The cross-linking of the polyimide blend membranes provides membranes with superior selectivity and improved chemical and thermal stabilities compared to the corresponding uncross-linked polyimide blend membranes.

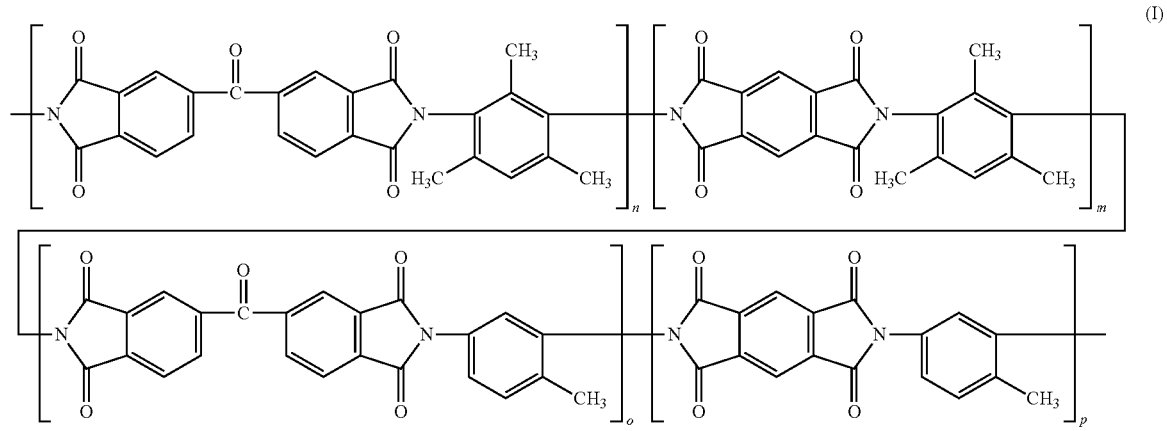

wherein n, m, o, and p are independent integers from 20 to 500; and wherein formula (II) is:

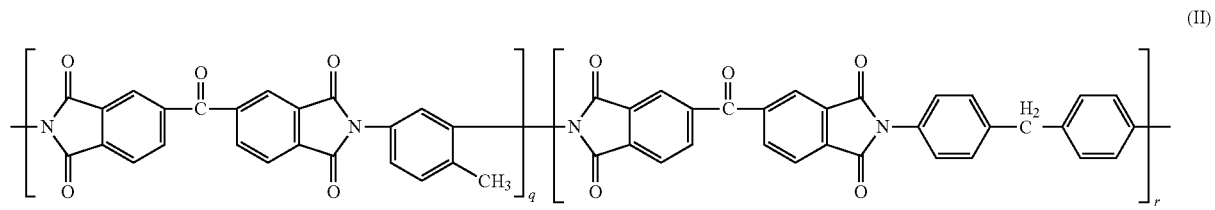

wherein q and r are independent integers from 20 to 500; and wherein the weight ratio of said aromatic polyimide I to said aromatic polyimide II is in a range of 10:1 to 1:10.

The polyimide blend membrane in the present invention was prepared by blending an aromatic polyimide I with high permeability and an aromatic polyimide II with high selectivity for gas separation. The polyimide blend membrane in the present invention showed improved permeability compared to the aromatic polyimide II and improved selectivity compared to the aromatic polyimide I.

The polyimide polymers used for making the polyimide blend membranes with high selectivities described in the current invention have a weight average molecular weight in the range of 50,000 to 1,000,000 Daltons, preferably between 70,000 to 500,000 Daltons.

In another embodiment of the invention, the polyimide blend membranes in the present invention have undergone an additional UV cross-linking process. The polyimide blend membranes in the present invention have UV cross-linkable benzophenone functional groups. The cross-linked polyimide blend membranes comprise polymer chain segments where at least part of these polymer chain segments are cross- The polyimide blend membrane in the present invention can be either asymmetric integrally skinned membrane or thin film composite (TFC) membrane.

The asymmetric integrally-skinned flat sheet or hollow fiber polyimide blend membranes in the present invention were prepared by a phase inversion process. In some cases, UV radiation was applied to the surface of the membrane to further improve the membrane selectivity.

The membrane dope formulation for the preparation of asymmetric integrally-skinned flat sheet or hollow fiber polyimide blend membrane with high selectivities for gas separations in the present invention comprises good solvents for the polyimide polymers that can completely dissolve the polymers. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, mixtures thereof, others known to those skilled in the art and mixtures thereof. In some cases, the membrane dope formulation for the preparation of asymmetric integrally-skinned flat sheet or hollow fiber polyimide blend membrane with high selectivities for gas separations in the present invention also comprises poor solvents for the polyimide polymers that cannot dissolve the polymers such as acetone, methanol, ethanol, tetrahydrofuran (THF), toluene, n-octane, n-decane, lactic acid, citric acid, isopropanol, and mixtures thereof. It is believed that the proper weight ratio of the solvents used in the present invention provides asymmetric integrally-skinned flat sheet or hollow fiber polyimide blend membrane with <200 nm super thin nonporous selective skin layer which results in high permeances.

The thin film composite polyimide blend membrane described in the current invention comprises a thin nonporous selective separation layer comprising the polyimide blend described in the present invention and a porous nonselective mechanical support layer made from a material different from the polyimide blend described in the present invention or a polymer blend comprising a first polymer different from any of the polyimides in the polyimide blend described in the present invention and a second polymer that is the same as one of the polyimides in the polyimide blend described in the present invention. The porous nonselective mechanical support layer described in the present invention with a low selectivity and high flux can be made from materials including cellulosic polymers, polysulfone, polyethersulfone, polyamide, polyimide, polyetherimide, cellulose nitrate, polyurethane, polycarbonate, polystyrene, polybenzoxazole, or mixtures thereof.

One asymmetric integrally-skinned hollow fiber polyimide blend membrane PI-1/PI-2 described in the present invention is fabricated from a blend of a poly(3,3',4,4'-benzophenone tetracarboxylic dianhydride-pyromellitic dianhydride-2,4,6-trimethyl-m-phenylenediamine-2,4-toluenediamine) (PI-1) derived from the condensation reaction of 3,3',4,4'-benzophenone tetracarboxylic dianhydride (BTDA) and pyromellitic dianhydride (PMDA) with a mixture of 2,4,6-trimethyl-m-phenylenediamine (TMPDA) and 2,4-toluenediamine (2,4-TDA) (BTDA:PMDA:TMPDA:2,4-TDA=3:2:3:2 (molar ratio) and a poly(3,3',4,4'-benzophenone tetracarboxylic dianhydride-2,4-toluenediamine-4,4'-methylenedianiline) (PI-2) derived from the condensation reaction of BTDA with a mixture of 2,4-TDA and 4,4'-methylenedianiline (MDA) (BTDA:2,4-TDA:MDA=5:4:1 (molar ratio). The weight ratio of PI-1 to PI-2 is 1:1.2. The blend PI-1/PI-2-O-5Si2.5U asymmetric integrally-skinned hollow fiber membrane with 2.5 minutes of UV treatment showed high $H_2/CH_4$ separation performance with $H_2$ permeance of 198 GPU and $H_2/CH_4$ selectivity of 184 for $H_2/CH_4$ separation. The blend PI-1/PI-2-O-5Si2.5U asymmetric integrally-skinned hollow fiber membrane with 2.5 minutes of UV treatment also showed high $CO_2/CH_4$ separation performance with $CO_2$ permeance of 74 GPU and $CO_2/CH_4$ selectivity of 30.1 for $CO_2/CH_4$ separation.

The invention provides a process for separating at least one gas from a mixture of gases using the polyimide blend membrane described herein, the process comprising: (a) providing a polyimide blend membrane described in the present invention which is permeable to said at least one gas; (b) contacting the mixture on one side of the polyimide blend membrane to cause said at least one gas to permeate the membrane; and (c) removing from the opposite side of the membrane a permeate gas composition comprising a portion of said at least one gas which permeated said membrane.

The polyimide blend membranes described in the current invention are not only suitable for $H_2$ purification application, but also suitable for a variety of other gas separations such as $CO_2/CH_4$, $O_2/N_2$, and $H_2S/CH_4$ separations.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The membranes that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases: such as nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including nitrogen enrichment from air, hydrogen from nitrogen, argon or methane, carbon dioxide removal from natural gas and biogas and in enhanced oil recovery.

The present invention provides polyimide blend membranes. This invention also pertains to the application of the polyimide blend membranes for $H_2$ purifications such as $H_2/CH_4$ separation, and also for a variety of other gas separations such as separations of $CO_2/CH_4$, $H_2S/CH_4$, $CO_2/N_2$, olefin/paraffin separations (e.g. propylene/propane separation), and $O_2/N_2$ separations.

The present invention provides a polyimide blend membrane comprising a miscible blend of an aromatic polyimide I that comprises a plurality of repeating units of formula (I) and an aromatic polyimide II that comprises a plurality of repeating units of formula (II), wherein formula (I) is

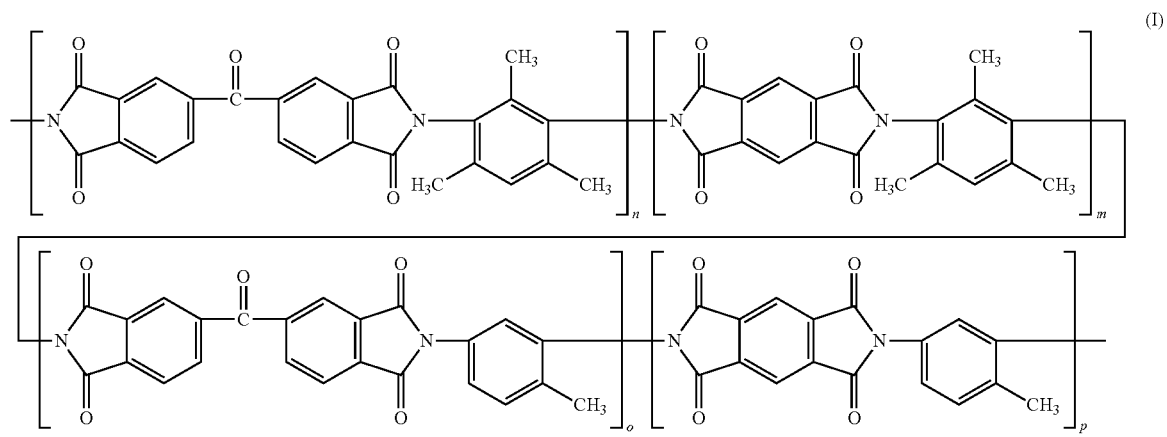

wherein n, m, o, and p are independent integers from 20 to 500; and wherein formula (II) is:

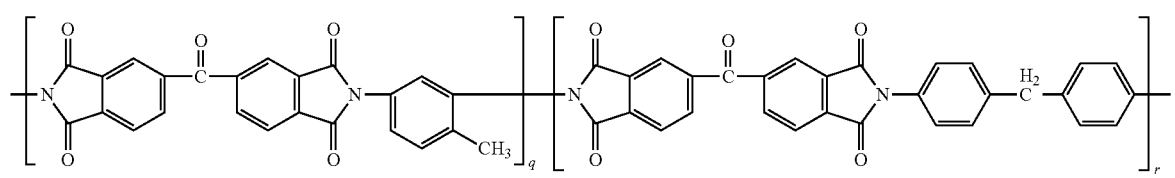

wherein q and r are independent integers from 20 to 500; and wherein the weight ratio of said aromatic polyimide I to said aromatic polyimide II is in a range of 10:1 to 1:10.

The polyimide polymers used for making the polyimide blend membranes with high selectivities described in the current invention have a weight average molecular weight in the range of 50,000 to 1,000,000 Daltons, preferably between 70,000 to 500,000 Daltons.

The polyimide blend membrane in the present invention was prepared by blending an aromatic polyimide I with high permeability and an aromatic polyimide II with high selectivity for gas separation. The polyimide blend membrane in the present invention showed improved permeability compared to the aromatic polyimide II and improved selectivity compared to the aromatic polyimide I.

In another embodiment of the invention, the polyimide blend membranes in the present invention have undergone an additional UV cross-linking process. The polyimide blend membranes in the present invention have UV cross-linkable benzophenone functional groups. The cross-linked polyimide blend membranes comprise polymer chain segments where at least part of these polymer chain segments are cross-linked to each other through possible direct covalent bonds by exposure to UV radiation. The thickness of the UV cross-linked surface layer of the polyimide blend membrane described in the present invention is in a range of 20 nm to 5 microns. The cross-linking of the polyimide blend membranes provides membranes with superior selectivity and improved chemical and thermal stabilities compared to the corresponding uncross-linked polyimide blend membranes.

One preferred aromatic polyimide polymer I that is used for the formation of the polyimide blend membrane in the present invention is poly(3,3',4,4'-benzophenone tetracarboxylic dianhydride-pyromellitic dianhydride-2,4,6-trimethyl-m-phenylenediamine-2,4-toluenediamine) (PI-1) derived from the condensation reaction of 3,3',4,4'-benzophenone tetracarboxylic dianhydride (BTDA) and pyromellitic dianhydride (PMDA) with a mixture of 2,4,6-trimethyl-m-phenylenediamine (TMPDA) and 2,4-toluenediamine (2,4-TDA). The molar ratio of BTDA to PMDA is in a range of 5:1 to 1:5. The molar ratio of TMPDA to 2,4-TDA is in a range of 5:1 to 1:5. The molar ratio of the total dianhydrides of BTDA and PMDA to the total diamines of TMPDA and 2,4-TDA is 1:1.

One preferred aromatic polyimide polymer II that is used for the formation of the polyimide blend membrane in the present invention is poly(3,3',4,4'-benzophenone tetracarboxylic dianhydride-2,4-toluenediamine-4,4'-methylenedianiline) (PI-2) derived from the condensation reaction of BTDA with a mixture of 2,4-TDA and 4,4'-methylenedianiline (MDA). The molar ratio of 2,4-TDA to MDA is in a range of 10:1 to 1:10. The molar ratio of BTDA dianhydride to the total diamines of 2,4-TDA and MDA is 1:1.

The polyimide blend membrane in the present invention can be either asymmetric integrally skinned membrane or thin film composite (TFC) membrane.

The asymmetric integrally-skinned flat sheet or hollow fiber polyimide blend membranes in the present invention were prepared by a phase inversion process. In some cases, UV radiation was applied to the surface of the membrane to further improve the membrane selectivity.

The membrane dope formulation for the preparation of asymmetric integrally-skinned flat sheet or hollow fiber polyimide blend membrane with high selectivities for gas separations in the present invention comprises good solvents for the polyimide polymers that can completely dissolve the polymers. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, mixtures thereof, others known to those skilled in the art and mixtures thereof. In some cases, the membrane dope formulation for the preparation of asymmetric integrally-skinned flat sheet or hollow fiber polyimide blend membrane with high selectivities for gas separations in the present invention also comprises poor solvents for the polyimide polymers that cannot dissolve the polymers such as acetone, methanol, ethanol, tetrahydrofuran (THF), toluene, n-octane, n-decane, lactic acid, citric acid, isopropanol, and mixtures thereof. It is believed that the proper weight ratio of the solvents used in the present invention provides asymmetric integrally-skinned flat sheet or hollow fiber polyimide blend membrane with <200 nm super thin nonporous selective skin layer which results in high permeances.

The thin film composite polyimide blend membrane described in the current invention comprises a thin nonporous selective separation layer comprising the polyimide blend described in the present invention and a porous nonselective mechanical support layer made from a material different from the polyimide blend described in the present invention or a polymer blend comprising a first polymer different from any of the polyimides in the polyimide blend described in the present invention and a second polymer that is the same as one of the polyimides in the polyimide blend described in the present invention. The thin film composite polyimide blend membrane described in the current invention has either hollow fiber or flat sheet geometry.

The porous nonselective mechanical support layer has low selectivity and high flux. Selection of the porous nonselective mechanical support layer for the preparation of TFC polyimide blend membrane in the present invention may be made on the basis of the heat resistance, solvent resistance, and mechanical strength of the porous nonselective mechanical support layer, as well as other factors dictated by the operating conditions for selective permeation. The porous nonselective mechanical support layer is preferably at least partially self-supporting, and in some instances may be essentially self-supporting. The porous nonselective mechanical support layer may provide essentially all of the structural support for the membrane. Some preferred polymers that are suitable for the preparation of the porous nonselective mechanical support layer for the TFC polyimide blend membrane according to the present invention include, but are not limited to, polysulfones, sulfonated polysulfones, polyethersulfones (PESs), sulfonated PESs, polyethers, polyetherimides such as Ultem, cellulosic polymers such as cellulose acetate and cellulose triacetate, polyamides, polyimides, polyether ketones, and blends thereof.

Some preferred solvents that can be used for dissolving the polyimide blends for the preparation of TFC polyimide blend membrane described in the current invention include NMP, N,N-dimethyl DMAC, methylene chloride, DMF, DMSO, dioxanes, 1,3-dioxolane, acetone, isopropanol, and mixtures thereof. For the preparation of TFC polyimide blend flat sheet membrane, it is preferred that the polyimide blend solution has a concentration of from about 1 to about 20 wt % to provide an effective coating. The dilute polyimide blend solution is applied to the surface of the porous nonselective mechanical support layer by dip-coating, spin coating, casting, spraying, painting, and other known conventional solution coating technologies. For the preparation of TFC polyimide blend hollow fiber membrane, it is preferred that the polyimide blend solution has a concentration of from about 20 to about 40 wt %. The polyimide blend solution and the polymer solution for the formation of the porous nonselective mechanical support layer were co-extruded from a spinneret.

The invention provides a process for separating at least one gas from a mixture of gases using the polyimide blend membrane described in the present invention, the process comprising: (a) providing a polyimide blend membrane described in the present invention which is permeable to said at least one gas; (b) contacting the mixture on one side of the polyimide blend membrane described in the present invention to cause said at least one gas to permeate the membrane; and (c) removing from the opposite side of the membrane a permeate gas composition comprising a portion of said at least one gas which permeated said membrane.

The polyimide blend membrane described in the present invention is especially useful in the purification, separation or adsorption of a particular species in the liquid or gas phase.

The polyimide blend membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the polyimide blend membrane described in the present invention. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the polyimide blend membrane of the present invention will range from about −20° to about 100° C., and most preferably, the effective operating temperature of the membranes of the present invention will range from about 25° to about 100° C.

The polyimide blend membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the polyimide blend membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery.

The polyimide blend membrane described in the present invention also has immediate application to concentrate olefin in a paraffin/olefin stream for olefin cracking application. For example, the polyimide blend membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the polyimide blend membrane described in the present invention is for separating isoparaffin and normal paraffin in light paraffin isomerization and Max-Ene™, a process for enhancing the concentration of normal paraffin (n-paraffin) in the naphtha cracker feedstock, which can be then converted to ethylene.

The polyimide blend membrane described in the present invention can also be operated at high temperature to provide the sufficient dew point margin for natural gas upgrading (e.g., $CO_2$ removal from natural gas). The polyimide blend membrane described in the present invention can be used in either a single stage membrane or as the first or/and second stage membrane in a two stage membrane system for natural gas upgrading.

EXAMPLES

The following examples are provided to illustrate one or more preferred embodiments of the invention, but are not limited embodiments thereof. Numerous variations can be made to the following examples that lie within the scope of the invention.

Example 1

Preparation of PI-1/PI-2(5:6) and UV Cross-Linked PI-1/PI-2(5:6) Polyimide Blend Dense Film Membranes 2.5 g of aromatic polyimide poly(3,3',4,4'-benzophenone tetracarboxylic dianhydride-pyromellitic dianhydride-2,4,6-trimethyl-m-phenylenediamine-2,4-toluenediamine) (PI-1) containing UV cross-linkable carbonyl groups and 3.0 g of poly(3,3',4,4'-benzophenone tetracarboxylic dianhydride-2,4-toluenediamine-4,4'-methylenedianiline) (PI-2) containing UV cross-linkable carbonyl groups were dissolved in a solvent mixture of 12.0 g of NMP and 15.0 g of 1,3-dioxolane. The mixture was mechanically stirred for 2 hours to form a homogeneous casting dope. The resulting homogeneous casting dope was filtered and allowed to degas overnight. The PI-1/PI-2(5:6) polyimide blend dense film membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form a polymer membrane in dense film.

The PI-1/PI-2(5:6) polyimide blend dense film membrane was further UV cross-linked by exposure to UV radiation using 254 nm wavelength UV light with a radiation time of 10 minutes at 50° C.

Example 2

Evaluation of the $CO_2/CH_4$ and $H_2/CH_4$ Separation Performance of PI-1/PI-2(5:6) and UV Cross-Linked PI-1/PI-2(5:6) Polyimide Blend Dense Film Membranes Prepared in Example 1

The PI-1/PI-2(5:6) and UV cross-linked PI-1/PI-2(5:6) polyimide blend dense film membranes were tested for $CO_2/CH_4$ and $H_2/CH_4$ separations at 50° C. under 791 kPa (100 psig) pure gas feed pressure. The results in Tables 1 and 2 show that the new PI-1/PI-2(5:6) polyimide blend dense film membrane has intrinsic $CO_2$ permeability of 6.94 Barrers (1 Barrer=$10^{-10}$ $cm^3$ (STP) $cm/cm^2$ s (cm Hg)) and single-gas $CO_2/CH_4$ selectivity of 34.4 at 50° C. under 791 kPa for $CO_2/CH_4$ separation. This membrane also has intrinsic $H_2$ permeability of 28.1 Barrers and single-gas $H_2/CH_4$ selectivity of 139.1 at 50° C. under 791 kPa for $H_2/CH_4$ separation. It can be seen from Tables 1 and 2 that the PI-1/PI-2(5:6) polyimide blend dense film membrane showed significantly improved $CO_2/CH_4$ and $H_2/CH_4$ selectivities after UV cross-linking

TABLE 1

Pure gas permeation test results of PI-1/PI-2(5:6) and UV cross-linked PI-1/PI-2(5:6) polyimide blend dense film membranes for $CO_2/CH_4$ separation *

| Dense Film Membrane | $P_{CO2}$ (Barrer) | $\alpha_{CO2/CH4}$ |
|---|---|---|
| PI-1/PI-2(5:6) | 6.94 | 34.4 |
| UV cross-linked PI-1/PI-2(5:6) | 6.33 | 48.0 |

* $P_{CO2}$ and $P_{CH4}$ were tested at 50° C. and 791 kPa (100 psig);
1 Barrer = $10^{-10}$ $cm^3$(STP).cm/$cm^2$.sec.cmHg.

TABLE 2

Pure gas permeation test results of PI-1/PI-2(5:6) and UV cross-linked PI-1/PI-2(5:6) polyimide blend dense film membranes for $H_2/CH_4$ separation *

| Dense Film Membrane | $P_{H2}$ (Barrer) | $\alpha_{CO2/CH4}$ |
|---|---|---|
| PI-1/PI-2(5:6) | 28.1 | 139.1 |
| UV cross-linked PI-1/PI-2(5:6) | 27.6 | 209.0 |

* $P_{H2}$ and $P_{CH4}$ were tested at 50° C. and 791 kPa (100 psig);
1 Barrer = $10^{-10}$ $cm^3$(STP).cm/$cm^2$.sec.cmHg.

Example 3

Preparation of PI-1/PI-2(5:6) Polyimide Blend Hollow Fiber Membranes

A hollow fiber spinning dope containing 11.9 g of PI-1 polyimide, 14.3 g of PI-2 polyimide, 65.0 g of NMP, and 6.0 g of 1,3-dioxolane was prepared. The spinning dope was extruded at a flow rate of 3.0-4.0 mL/min through a spinneret at 50° C. spinning temperature. A bore fluid containing 10% by weight of water in NMP was injected to the bore of the fiber at a flow rate of 0.6 mL/min simultaneously with the extruding of the spinning dope. The nascent fiber traveled through an air gap length of 5-7 cm at room temperature, and then was immersed into a water coagulant bath at 19° C. and wound up at a rate of 23-30 m/min. The water-wet fiber was annealed in a hot water bath at 85° C. for 30 minutes. The annealed water-wet fiber was then sequentially exchanged with methanol and hexane for three times and for 30 minutes each time, followed by drying at 100° C. in an oven for 1 hour to form PI-1/PI-2(5:6) polyimide blend hollow fiber membranes with the spinning conditions listed in Table 3.

TABLE 3

Spinning conditions for PI-1/PI-2(5:6) polyimide blend hollow fiber membranes

| Hollow Fiber Membrane | Air gap (cm) | Dope rate (mL/min) | Bore rate (mL/min) | Take-up rate (m/min) |
|---|---|---|---|---|
| PI-1/PI-2-O | 5 | 3.0 | 0.6 | 23.5 |
| PI-1/PI-2-P | 5 | 3.0 | 0.6 | 30.2 |
| PI-1/PI-2-W | 10 | 3.6 | 0.6 | 23.5 |
| PI-1/PI-2-Y | 7 | 3.0 | 0.6 | 23.5 |
| PI-1/PI-2-G | 3 | 4.0 | 0.6 | 30.2 |

Example 4

Preparation of UV cross-linked PI-1/PI-2(5:6) polyimide blend hollow fiber membranes The PI-1/PI-2(5:6) polyimide blend hollow fiber membranes prepared in Example 3 were coated with 5 wt % of thermally curable RTV silicone solution in hexane and then cured at 85° C. for 1 hour. The RTV silicone-coated polyimide blend hollow fiber membranes were cross-linked via UV radiation for 2.5 minutes using a UV lamp with intensity of 1.45 mW/cm$^2$.

Example 5

Evaluation of $CO_2/CH_4$ Separation Performance of UV Cross-Linked PI-1/PI-2(5:6) Polyimide Blend Hollow Fiber Membranes The PI-1/PI-2-O-5Si2.5U, PI-1/PI-2-P-5Si2.5U, and PI-1/PI-2-Y-5Si2.5U UV cross-linked polyimide blend hollow fiber membranes were tested for $CO_2/CH_4$ separation at 50° C. under 5617 kPa (800 psig) feed gas pressure with 10% of $CO_2$ and 90% of $CH_4$ in the feed. The results are shown in Table 4. It can be seen from Table 4 that all membranes described in the current invention showed high $CO_2$ permeances of 68-74 GPU and high $CO_2/CH_4$ selectivities of 28-30.

TABLE 4

$CO_2/CH_4$ separation performance of PI-1/PI-2(5:6) and UV cross-linked PI-1/PI-2(5:6) polyimide blend hollow fiber membranes

| Membrane | $CO_2$ permeance (GPU) | $CO_2/CH_4$ selectivity |
|---|---|---|
| PI-1/PI-2-O-5Si2.5U | 73.7 | 30.1 |
| PI-1/PI-2-P-5Si2.5U | 70.2 | 30.3 |
| PI-1/PI-2-Y-5Si2.5U | 68.1 | 28.2 |

1 GPU = $10^{-6}$ cm$^3$ (STP)/cm$^2$ s (cm Hg) Testing conditions: 50° C., 5617 kPa (800 psig) feed gas pressure, 10% $CO_2$ and 90% of $CH_4$ in the feed.

Example 6

Evaluation of $H_2/CH_4$ Separation Performance of UV Cross-Linked PI-1/PI-2(5:6) Polyimide Blend Hollow Fiber Membranes The PI-1/PI-2-O-5Si2.5U, PI-1/PI-2-P-5Si2.5U, and PI-1/PI-2-Y-5Si2.5U UV cross-linked polyimide blend hollow fiber membranes were tested for $H_2/CH_4$ separation at 50° C. under 5617 kPa (800 psig) feed gas pressure with 10% of $H_2$ and 90% of $CH_4$ in the feed. The results are shown in Table 5. It can be seen from Table 5 that all membranes described in the current invention showed high $H_2$ permeances of 187-232 GPU and high $H_2/CH_4$ selectivities of 145-224.

TABLE 5

$H_2/CH_4$ separation performance of PI-1/PI-2(5:6) and UV cross-linked PI-1/PI-2(5:6) polyimide blend hollow fiber membranes

| Membrane | $H_2$ permeance (GPU) | $H_2/CH_4$ selectivity |
|---|---|---|
| PI-1/PI-2-O-5Si2.5U | 198.1 | 184.2 |
| PI-1/PI-2-P-5Si2.5U | 231.6 | 224.0 |
| PI-1/PI-2-Y-5Si2.5U | 187.3 | 145.1 |

1 GPU = $10^{-6}$ cm$^3$ (STP)/cm$^2$ s (cm Hg) Testing conditions: 50° C., 5617 kPa (800 psig) feed gas pressure, 10% $H_2$ and 90% of $CH_4$ in the feed.

Example 7

Preparation of PI-1/PI-2(6:5) and UV Cross-Linked PI-1/PI-2(6:5) Polyimide Blend Dense Film Membranes 3.0 G of aromatic polyimide poly(3,3',4,4'-benzophenone tetracarboxylic dianhydride-pyromellitic dianhydride-2,4,6-trimethyl-m-phenylenediamine-2,4-toluenediamine) (PI-1) containing UV cross-linkable carbonyl groups and 2.5 g of poly(3,3',4,4'-benzophenone tetracarboxylic dianhydride-2,4-toluenediamine-4,4'-methylenedianiline) (PI-2) containing UV cross-linkable carbonyl groups were dissolved in a solvent mixture of 12.0 g of NMP and 15.0 g of 1,3-dioxolane. The mixture was mechanically stirred for 2 hours to form a homogeneous casting dope. The resulting homogeneous casting dope was filtered and allowed to degas overnight. The PI-1/PI-2(6:5) polyimide blend dense film membrane was prepared from the bubble free casting dope on a clean glass plate using a doctor knife with a 20-mil gap. The membrane together with the glass plate was then put into a vacuum oven. The solvents were removed by slowly increasing the vacuum and the temperature of the vacuum oven. Finally, the membrane was dried at 200° C. under vacuum for at least 48 hours to completely remove the residual solvents to form a polymer membrane in dense film.

The PI-1/PI-2(6:5) polyimide blend dense film membrane was further UV cross-linked by exposure to UV radiation using 254 nm wavelength UV light with a radiation time of 10 minutes at 50° C.

Example 8

Evaluation of the $CO_2/CH_4$ and $H_2/CH_4$ Separation Performance of PI-1/PI-2(6:5) and UV Cross-Linked PI-1/PI-2(6:5) Polyimide Blend Dense Film Membranes Prepared in Example 7

The PI-1/PI-2(6:5) and UV cross-linked PI-1/PI-2(6:5) polyimide blend dense film membranes were tested for $CO_2$/

$CH_4$ and $H_2/CH_4$ separations at 50° C. under 791 kPa (100 psig) pure gas feed pressure. The results in Tables 6 and 7 show that the new PI-1/PI-2(6:5) polyimide blend dense film membrane has intrinsic $CO_2$ permeability of 10.8 Barrers (1 Barrer=$10^{10}$ cm³ (STP) cm/cm² s (cm Hg)) and single-gas $CO_2/CH_4$ selectivity of 30.0 at 50° C. under 791 kPa for $CO_2/CH_4$ separation. This membrane also has intrinsic $H_2$ permeability of 36.1 Barrers and single-gas $H_2/CH_4$ selectivity of 100.7 at 50° C. under 791 kPa for $H_2/CH_4$ separation. It can be seen from Tables 6 and 7 that the PI-1/PI-2(6:5) polyimide blend dense film membrane showed significantly improved $CO_2/CH_4$ and $H_2/CH_4$ selectivities after UV cross-linking

TABLE 6

Pure gas permeation test results of PI-1/PI-2(6:5) and UV cross-linked PI-1/PI-2(6:5) polyimide blend dense film membranes for $CO_2/CH_4$ separation *

| Dense Film Membrane | $P_{CO2}$ (Barrer) | $\alpha_{CO2/CH4}$ |
| --- | --- | --- |
| PI-1/PI-2(6:5) | 10.8 | 30.0 |
| UV cross-linked PI-1/PI-2(6:5) | 9.40 | 36.3 |

* $P_{CO2}$ and $P_{CH4}$ were tested at 50° C. and 791 kPa (100 psig);
1 Barrer = $10^{-10}$ cm³(STP).cm/cm².sec.cmHg.

TABLE 7

Pure gas permeation test results of PI-1/PI-2(6:5) and UV cross-linked PI-1/PI-2(6:5) polyimide blend dense film membranes for $H_2/CH_4$ separation *

| Dense Film Membrane | $P_{H2}$ (Barrer) | $\alpha_{CO2/CH4}$ |
| --- | --- | --- |
| PI-1/PI-2(6:5) | 36.1 | 100.7 |
| UV cross-linked PI-1/PI-2(6:5) | 35.2 | 135.9 |

* $P_{H2}$ and $P_{CH4}$ were tested at 50° C. and 791 kPa (100 psig);
1 Barrer = $10^{-10}$ cm³(STP).cm/cm².sec.cmHg.

Example 9

Preparation of PI-1/PI-2(6:5) Polyimide Blend Hollow Fiber Membranes

A hollow fiber spinning dope containing 14.4 g of PI-1 polyimide, 12.0 g of PI-2 polyimide, 65.0 g of NMP, and 6.0 g of 1,3-dioxolane was prepared. The spinning dope was extruded at a flow rate of 3.0-3.8 mL/min through a spinneret at 50° C. spinning temperature. A bore fluid containing 10% by weight of water in NMP was injected to the bore of the fiber at a flow rate of 0.6 mL/min simultaneously with the extruding of the spinning dope. The nascent fiber traveled through an air gap length of 7-10 cm at room temperature, and then was immersed into a water coagulant bath at 19° C. and wound up at a rate of 23-30 m/min. The water-wet fiber was annealed in a hot water bath at 85° C. for 30 minutes. The annealed water-wet fiber was then sequentially exchanged with methanol and hexane for three times and for 30 minutes each time, followed by drying at 100° C. in an oven for 1 hour to form PI-1/PI-2(6:5) polyimide blend hollow fiber membranes with the spinning conditions listed in Table 8. The PI-1/PI-2(6:5) polyimide blend hollow fiber membranes were then coated with 2 wt % of thermally curable RTV silicone solution in hexane and then cured at 100° C. for 1 hour.

TABLE 8

Spinning conditions for PI-1/PI-2(6:5) polyimide blend hollow fiber membranes

| Hollow Fiber Membrane | Air gap (cm) | Dope rate (mL/min) | Bore rate (mL/min) | Take-up rate (m/min) |
| --- | --- | --- | --- | --- |
| PI-1/PI-2-6-5-O-2RTV | 7 | 3.8 | 0.6 | 30.2 |
| PI-1/PI-2-6-5-G-2RTV | 7 | 3.8 | 0.6 | 23.5 |
| PI-1/PI-2-6-5-B-2RTV | 7 | 3.0 | 0.6 | 23.5 |

Example 10

Evaluation of $CO_2/CH_4$ Separation Performance of PI-1/PI-2(6:5) Polyimide Blend Hollow Fiber Membranes The PI-1/PI-2-6-5-O-2RTV and PI-1/PI-2-6-5-B-2RTV polyimide blend hollow fiber membranes were tested for $CO_2/CH_4$ separation at 50° C. under 5617 kPa (800 psig) feed gas pressure with 10% of $CO_2$ and 90% of $CH_4$ in the feed. The results are shown in Table 9. It can be seen from Table 9 that PI-1/PI-2-6-5-O-2RTV membrane described in the current invention showed $CO_2$ permeances of 57 GPU and high $CO_2/CH_4$ selectivities of 28. PI-1/PI-2-6-5-B-2RTV membrane described in the current invention showed high $CO_2$ permeances of 78 GPU and high $CO_2/CH_4$ selectivities of 25.5.

TABLE 9

$CO_2/CH_4$ separation performance of PI-1/PI-2(6:5) polyimide blend hollow fiber membranes

| Membrane | $CO_2$ permeance (GPU) | $CO_2/CH_4$ selectivity |
| --- | --- | --- |
| PI-1/PI-2-6-5-O-2RTV | 57.0 | 28.0 |
| PI-1/PI-2-6-5-B-2RTV | 77.8 | 25.5 |

1 GPU = $10^{-6}$ cm³ (STP)/cm² s (cm Hg)Testing conditions: 50° C., 5617 kPa (800 psig) feed gas pressure, 10% $CO_2$ and 90% of $CH_4$ in the feed.

Example 11

Evaluation of $H_2/CH_4$ Separation Performance of PI-1/PI-2(6:5) Polyimide Blend Hollow Fiber Membranes The PI-1/PI-2-6-5-G-2RTV and PI-1/PI-2-6-5-B-2RTV polyimide blend hollow fiber membranes were tested for $H_2/CH_4$ separation at 50° C. under 5617 kPa (800 psig) feed gas pressure with 10% of $H_2$ and 90% of $CH_4$ in the feed. The results are shown in Table 10. It can be seen from Table 10 that both membranes described in the current invention showed high $H_2$ permeances of 285-298 GPU and high $H_2/CH_4$ selectivities of about 150-160.

TABLE 10

$H_2/CH_4$ separation performance of PI-1/PI-2(6:5) polyimide blend hollow fiber membranes

| Membrane | $H_2$ permeance (GPU) | $H_2/CH_4$ selectivity |
| --- | --- | --- |
| PI-1/PI-2-6-5-G-2RTV | 285 | 149.7 |
| PI-1/PI-2-6-5-B-2RTV | 298 | 161.9 |

1 GPU = $10^{-6}$ cm³ (STP)/cm² s (cm Hg)Testing conditions: 50° C., 5617 kPa (800 psig) feed gas pressure, 10% $H_2$ and 90% of $CH_4$ in the feed.

The invention claimed is:

1. A polyimide blend membrane comprising a miscible blend of a first aromatic polyimide that comprises a plurality of repeating units of formula (I) and a second aromatic polyimide that comprises a plurality of repeating units of formula (II), wherein formula (I) is represented by:

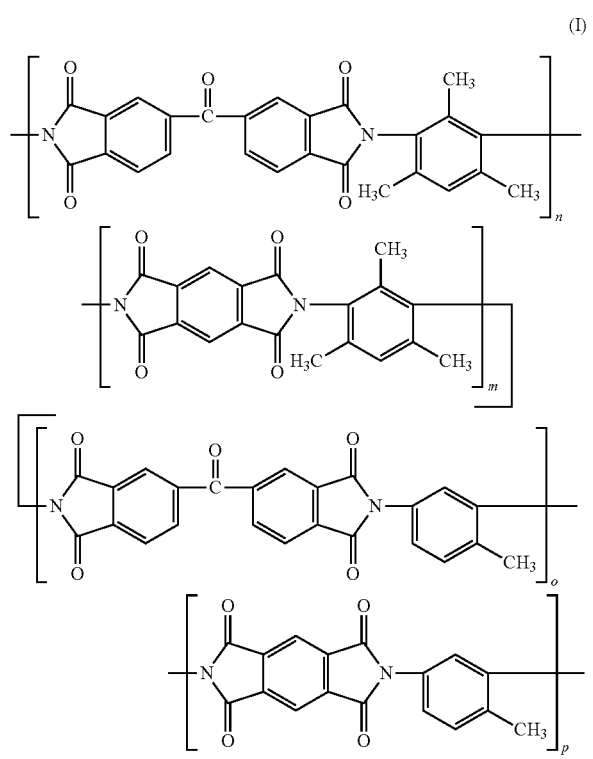

wherein n, m, o, and p are independent integers from 20 to 500; and wherein formula (II) is represented by:

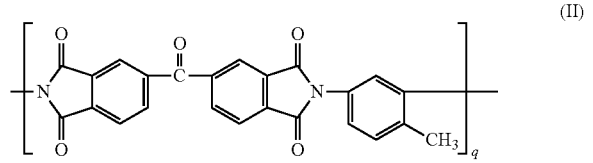

-continued

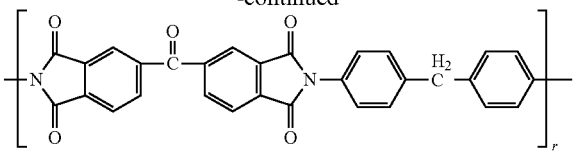

wherein q and r are independent integers from 20 to 500; and wherein the weight ratio of said first aromatic polyimide to said second aromatic polyimide is in a range from about 10:1 to 1:10.

2. The polyimide blend membrane of claim 1 wherein said membrane is an asymmetric integrally skinned membrane or a thin film composite membrane.

3. The polyimide blend membrane of claim 1 wherein said first aromatic polyimide has high permeability relative to said second polyimide and said second aromatic polyimide has high selectivity relative to said first aromatic polyimide.

4. The polyimide blend membrane of claim 1 wherein said polyimide blend membrane is cross-linked via UV radiation.

5. The polyimide blend membrane of claim 2 wherein said thin film composite membrane further comprises a porous nonselective mechanical support layer made from a material different from polyimide blend material.

6. The polyimide blend membrane of claim 2 wherein said thin film composite membrane further comprises a porous nonselective mechanical support layer made from a polymer blend comprising a first polymer different from the polyimides in the said polyimide blend and a second polymer the same as one of the polyimides in the said polyimide blend.

7. The polyimide blend membrane of claim 1 wherein said first aromatic polymer and said second aromatic polymer have a weight average molecular weight in a range from 50,000 to 1,000,000 Daltons.

8. The polyimide blend membrane of claim 1 comprising polymer chain segments wherein said polymer chain segments are cross-linked to a polymer chain segment through direct covalent bonds.

9. The polyimide blend membrane of claim 5 wherein said porous nonselective mechanical support layer comprises a material selected from the group consisting of cellulosic polymers, polysulfone, polyethersulfone, polyamide, polyimide, polyetherimide, cellulose nitrate, polyurethane, polycarbonate, polystyrene, polybenzoxazole, or mixtures thereof.

10. The polyimide blend membrane of claim 4 wherein a UV cross-linked surface layer of said polyimide blend membrane has a thickness in a range from about 20 nm to 5 microns.

* * * * *